United States Patent
Bacha

(10) Patent No.: US 9,342,123 B2
(45) Date of Patent: May 17, 2016

(54) DETERMINE VOLTAGE SUPPLIED TO A CORE

(71) Applicant: HEWLETT-PACKARD DEVELOPMENT COMPANY, L.P., Houston, TX (US)

(72) Inventor: Anys Bacha, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 148 days.

(21) Appl. No.: 13/845,399

(22) Filed: Mar. 18, 2013

(65) Prior Publication Data

US 2014/0281696 A1    Sep. 18, 2014

(51) Int. Cl.
*G06F 11/07* (2006.01)
*G06F 1/26* (2006.01)
*G06F 11/30* (2006.01)

(52) U.S. Cl.
CPC .............. *G06F 1/26* (2013.01); *G06F 11/076* (2013.01); *G06F 11/0724* (2013.01); *G06F 11/0793* (2013.01); *G06F 11/30* (2013.01)

(58) Field of Classification Search
CPC ............ G06F 11/0721; G06F 11/0793; G06F 11/076; G06F 11/0766; G06F 11/0724; G06F 1/26; G06F 1/3296; G06F 11/0772; G06F 1/3206
See application file for complete search history.

(56) References Cited

U.S. PATENT DOCUMENTS

| | | | | |
|---|---|---|---|---|
| 7,392,413 | B2 * | 6/2008 | Shikata ........................ | 713/321 |
| 7,516,358 | B2 * | 4/2009 | Haefliger et al. ............... | 714/10 |
| 7,877,657 | B1 * | 1/2011 | Miller et al. .................. | 714/733 |
| 8,190,946 | B2 * | 5/2012 | Kojima ......................... | 714/10 |
| 8,639,987 | B2 * | 1/2014 | Whatmough et al. ....... | 714/47.1 |
| 2003/0117214 | A1 * | 6/2003 | Yamamoto .................... | 327/564 |
| 2006/0195734 | A1 * | 8/2006 | Shibata et al. ................ | 714/724 |
| 2012/0216067 | A1 * | 8/2012 | Whatmough et al. ........... | 714/2 |
| 2013/0007516 | A1 * | 1/2013 | Wu et al. ......................... | 714/15 |

* cited by examiner

*Primary Examiner* — Nadeem Iqbal
(74) *Attorney, Agent, or Firm* — Hewlett Packard Enterprise Patent Department

(57) ABSTRACT

Techniques for determining the voltage to be supplied to a core of a central processing unit are provided. A core of a central processing unit is monitored for errors. The voltage to be supplied to the core is determined based on the monitored errors. The voltage supplied to the core is altered based on the determined voltage.

16 Claims, 7 Drawing Sheets

DETERMINE VOLTAGE SUPPLIED TO A CORE

BACKGROUND

Electrical components, such as Integrated Circuits (IC), require power for operation. A manufacturer of an IC typically specifies the nominal power requirements to ensure proper operation of the IC. For example, the manufacturer may specify a nominal voltage for the IC. As long as the IC is supplied with specified voltage, the IC will operate correctly, to the extent that no errors will be introduced by the IC due to insufficient power.

DETAILED DESCRIPTION

Figure 1:
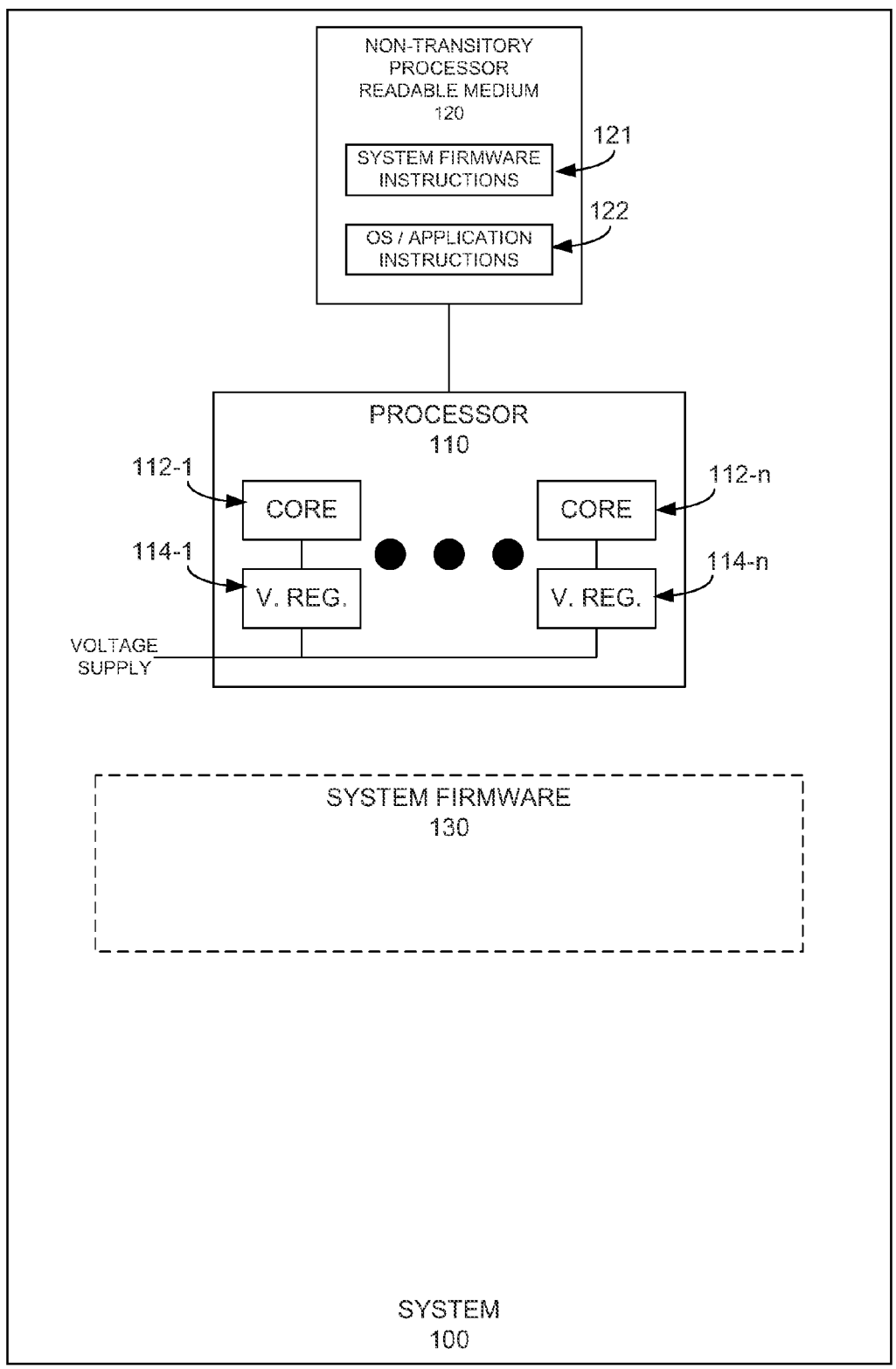
FIG. 1 is an example of a system to determine voltage supplied to a core, according to techniques described herein.

Although a manufacturer of an IC may specify the nominal voltage that is to be supplied to the IC, the specified voltage may not adequately reflect the minimum voltage actually needed by the IC for correct operation. For example, in the case of a central processing unit (CPU), which may also be referred to as a processor, the manufacturer may specify a certain nominal voltage for a class of processors. However, due to variations in the manufacturing process, the actual voltage needed by the processor for correct operation may be less than the nominal voltage. Thus, the CPU could safely operate at a lower voltage. It would be burdensome for the manufacturer to test each CPU to find the specific operating voltage for that individual IC. Furthermore, it would be difficult to design devices using the processor if the individual characteristics of an individual processor need be taken into account.

The problem is further exacerbated by CPUs with multiple cores. A core is an execution unit on a processor. Each core may execute an instruction stream somewhat independently. The nominal voltage needed by a core may vary due to variations in the manufacturing process. Thus, even on a single CPU, the individual cores on that CPU may have different nominal voltages. Again, it would be burdensome for the manufacturer to test each individual core on each individual CPU to determine the exact voltage needed.

Modern datacenters may operate with massive numbers of servers. Each of those servers may have multiple processors. Each of those processors may have multiple cores. Although the individual power savings from operating a single core at a voltage lower than the nominal voltage is likely small, the cumulative impact when multiplied by hundreds of thousands or even millions of cores in a large datacenter, is significant. Furthermore, operating a core at a lower voltage reduces the amount of heat generated by the core. As power, for both powering the servers and providing cooling to remove generated heat, is one of the major costs in operating a datacenter, any opportunity to reduce the amount of power used is beneficial.

The techniques described herein provide for a mechanism to reduce the voltage supplied to a core of a processor. System firmware may be used to monitor the operation of a core. The voltage supplied to the core may be reduced by the system firmware until the core no longer operates correctly. The voltage may then be increased by the system firmware until the core again operates correctly. In order to provide a margin of safety, the voltage may be increased past the point where the core begins to operate correctly again.

The techniques provided herein do not rely on additional circuitry in the hardware. Thus, the techniques described herein can be utilized on an IC that was not designed with circuitry intended for optimization of power usage. In other words, no additional circuitry needs to be included on the IC in order to implement the techniques described herein.

FIG. 1 is an example of a system to determine voltage supplied to a core, according to techniques described herein. System 100 may be any type of device that includes a processor 110. One example of such a device may be a computer, such as a server. Although the remainder of the disclosure will refer to a computer or a server, it should be understood that the techniques described herein are applicable to any type of device that includes a processor. The processor 110 may include multiple cores 112-1 ... n. As mentioned above, each of the cores may be an individual instruction execution unit, allowing the processor to execute multiple streams of instructions in parallel.

Each core may be coupled to a voltage supply through a voltage regulator 114-1 ... n. The voltage regulator may be coupled to a voltage supply (not shown). For example, the voltage supply may be a power supply within the system 100. The voltage supply may provide a voltage that is the nominal voltage specified by the manufacturer of the processor. The voltage regulator may regulate the voltage that is supplied to each core of the processor. The voltage regulator may be under the control of the system firmware, which is described below. The system firmware may determine the actual voltage that the regulator should supply to the core.

The system may also include a non-transitory processor readable medium 120 containing a set of instructions thereon. These instructions, when executed by the processor, may cause the processor to implement the techniques described herein. The medium 120 may include instructions to implement system firmware 121. System firmware may be instructions that enable operation of the processor within the system. For example, the system firmware may include instructions to initialize the processor, initialize memory attached to the processor (not shown), set various operating parameters of the processor, implement a basic input/output system (BIOS), and provide an interface for an operating system to begin execution. In other words, system firmware runs upon power up of the system in order to get the system into a state where an operating system may be loaded and take over control of the system. The medium may also include instructions to implement an operating system/applications 122, which are described in further detail below.

System firmware 130 represents the system firmware instructions as they are being executed by the processor. In other words, system firmware 130 is the software executing on the processor that provides the functionality to run the system. For example, the system firmware initializes the system to the point where an operating system may take over. The system firmware may also provide the BIOS for the system.

In operation, the system firmware 130 may monitor faults generated by the cores on the central processing unit. For example, the system firmware may monitor faults that occur on the core as it is being initialized. The system firmware may also monitor faults on the core as it is in operation under the control of an operating system. In either case, the system firmware is made aware of when a core is not operating correctly.

The system firmware may then determine if the voltage supplied to the core should be altered. For example, if errors are being generated by a core, this may mean that the voltage being supplied to the core is too low. Thus, the voltage regulator supplying voltage to the core should be instructed to increase the voltage being supplied to the core. On the other hand, if the core is not generating any errors, this may mean that the voltage being supplied to the core is too high. It may be possible to lower the voltage being supplied to the core to achieve power savings.

Based on this determination, the system firmware may instruct the voltage regulator supplying voltage to the core to adjust the voltage supplied, either upward or downward. The process that occurs during initialization, that is prior to an operating system running, is described in FIG. 2. The process that occurs once the operating system is up and running is described in FIG. 3.

Figure 2:
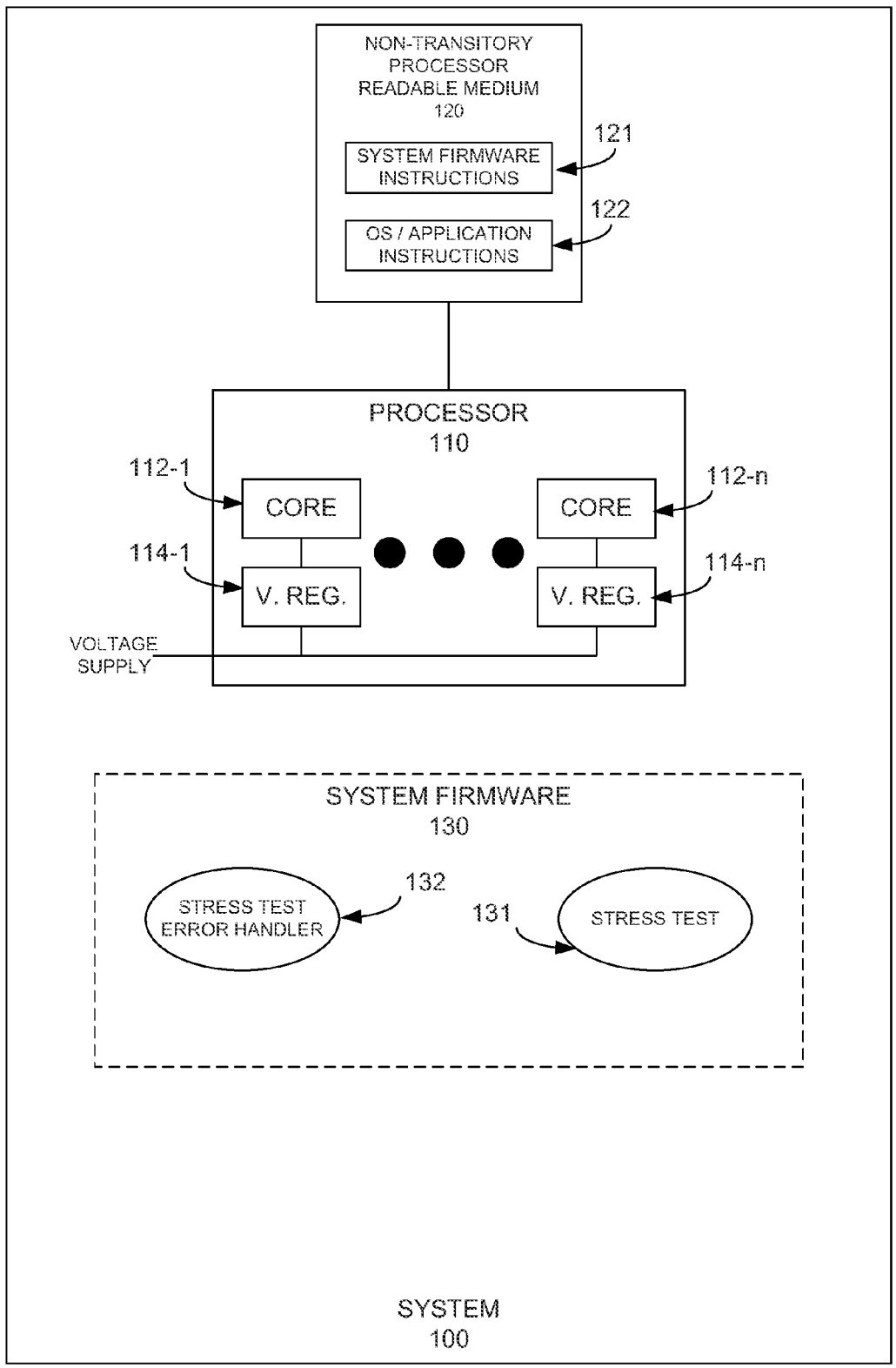
FIG. 2 is an example of a system to determine voltage supplied to a core, during initialization, according to techniques described herein.

FIG. 2 is an example of a system to determine voltage supplied to a core, during initialization, according to techniques described herein. As mentioned above, during initialization, the system firmware prepares the system for handover to an operating system. The initialization may include configuring the processor, initializing memory, starting the BIOS, and any number of other steps performed upon system startup. One of the initialization functions may be to determine the proper operating voltage for each of the cores.

In order to determine the proper operating voltage, the system firmware may cause all cores to rendezvous at a defined point in the firmware where the operating voltage for the cores is to be set. For example, the cores may be executing the system firmware to initialize the system. The firmware may include instructions that cause all of the cores to reach a certain point in execution, and wait there until all other cores have reached that point. This point is often referred to as a synchronization barrier. Once all the cores have reached the synchronization barrier, the process of setting the core voltages may begin.

At the synchronization barrier, all cores are being supplied with the nominal voltage specified by the processor manufacturer. Thus it can be ensured that errors are not being produced by the cores due to an under voltage condition. In one example implementation, one core of the plurality of cores 112-1 . . . n, is selected to be a controlling core, which may be referred to as the monarch core. The monarch core may instruct each of the remaining cores to execute a stress test 131.

The stress test 131 may be instructions in system firmware that fully exercise all of the functionality provided by the core. For example, the stress test may cause the core to read and write data to memory, read and write data to core internal registers, exercise any caches within the core, or any number of other tests. Processor manufacturers typically include stress test routines along with any other software needed to integrate the processor into a system. Even if such routines are not provided, creating instructions to exercise the processor would be a normal part of integrating a processor into a system.

Each of the cores, except for the monarch may execute the stress test and report a successful completion of the test to the monarch. For purposes of the remainder of this description, only a single core being tested is described, however it should be understood that the same process occurs for all non-monarch cores. Upon receipt of the successful completion from the core under test, the monarch core, executing the system firmware, may instruct the voltage regulator supplying voltage to the core under test to reduce the voltage. For example, the voltage may be decreased by a set amount, such as 5 millivolts (mV). Once the voltage adjustment is complete, the monarch may instruct the core under test to re-execute the stress test.

The process of running the stress test and decreasing the voltage may occur repeatedly, until the stress test fails. In the case of a failure, the core may enter a stress test error handler 132. The stress test error handler may be a set of instructions in the system firmware that are executed when the stress test fails. The stress test error handler may store the failure voltage, which is the voltage at which the core failed the stress test. In other words, the voltage currently being supplied to the core is stored as the failure voltage. The stress test error handler may then change the direction of the voltage modifications. In other words, the voltage may no longer be decreased by a set amount, but rather is increased.

In some cases, the core may fail the stress test in such a way that the core becomes locked up. If this occurs, the core will not be able to enter the stress test error handler. The monarch core may be responsible for monitoring the core to ensure that it either successfully completes the stress test or enters the stress test error handler. Otherwise, the monarch core may force the core under test to reset, and stores the failing voltage on behalf of the core under test.

Once the failure voltage is determined, the voltage supplied to the core may be increased by a set amount. For example, the voltage may be increased by 5 mV. The stress test may then be run again. If the test fails, the stress test error handler is again entered, and the process described above repeats. In some implementations, the process may end here for the core under test. The lowest voltage under which the core safely passes the stress test, or the success voltage, has now been determined, and the core can be set to operate at that voltage.

However, setting the voltage at just above the failure voltage does not leave any room for error. For example, as the system begins operation, various changes, such as processing load or temperature, may make the voltage insufficient. In order to overcome this problem, the process of increasing the voltage and re-running the stress test may be repeated until the success voltage exceeds the failure voltage by a preset amount. For example, the lowest voltage at which the stress test passes may be 0.70 volts. The process of running the stress test and increasing the voltage may be repeated until the voltage is set to 0.95 volts, thus providing 0.25 volts of headroom between the lowest passing voltage and the voltage that is supplied to the core. In some implementations, the amount of headroom may be a tunable parameter that is set by an administrator of the system. In other implementations, the headroom may be a hard coded value.

Once the operating voltage for all the cores, except for the monarch core, has been determined, the monitoring function of the monarch core may be passed to one of the other cores. Then, the process repeats on the core that was previously the monarch. Once the voltage of the core that was previously the monarch has been determined, all cores within the processor may have been set to a voltage that ensures proper operation while at the same time minimizing the amount of power consumed by the core.

In some implementations, the process described above occurs upon every restart of the system. However, it is likely that the voltages needed by each core, once determined, do not change within short periods of time. In some implementations, the determined voltages are saved in a non-volatile memory for use upon subsequent restarts of the system. To ensure that the stored voltages are correct, the system may periodically re-run the process described above. For example, the system firmware may include instructions to determine the proper voltages on every $10^{th}$ restart of the system. As another example, the proper voltages may be determined if the stored voltage values are over a certain number of days old.

Figure 3:
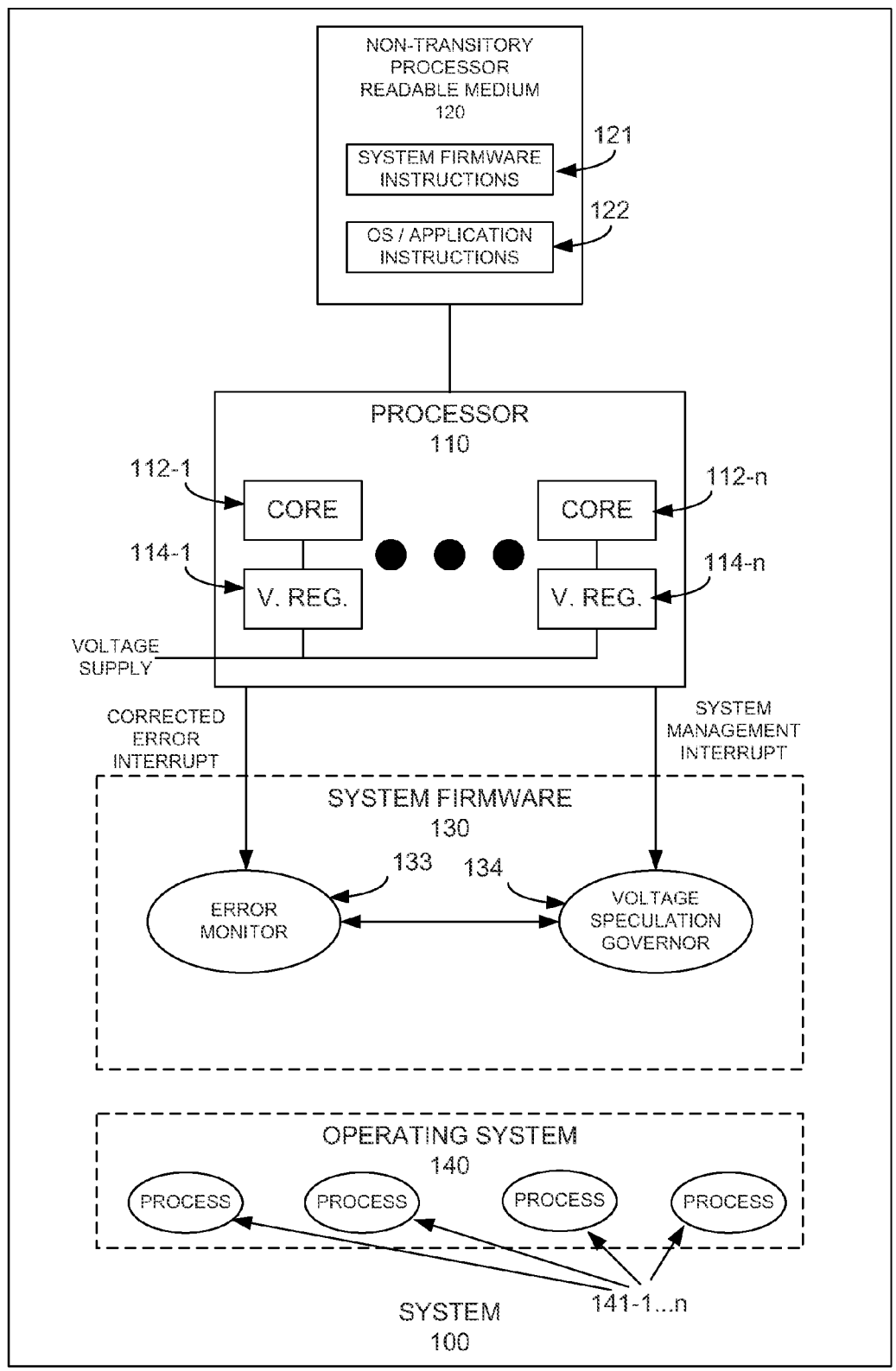
FIG. 3 is an example of a system to determine voltage supplied to a core, once an operating system is running, according to techniques described herein.

FIG. 3 is an example of a system to determine voltage supplied to a core, once an operating system is running, according to techniques described herein. Once the system firmware has completed initialization functions, control of the system may be handed over to an operating system 140. Some examples of operating systems include Windows™, Unix™, or Linux™ based operating system. However, any other type of operating system would also be suitable. The operating system is responsible for providing an environment in which applications 141-1 . . . n may run.

In some implementations it may be desired to monitor and tune the voltage supplied to the cores while the operating system is running. For example, the voltage that should be supplied to the core may change based on the workload that is being run by the core. For example, if a low stress workload is being run, the voltage needed by the core may be lower than what is currently being supplied to the core. The techniques described herein may also be used to adjust the core operating voltage while the system is under control of the operating system.

Processors typically include error correction codes (ECC) within their circuitry. An ECC may allow certain errors within the processor to be automatically corrected by the processor hardware. For example, common ECCs provide for single bit error correction, and multiple bit error detection. In other words, if there is an error in a single bit of a work unit, such as a cache line, the processor can automatically correct that error. An error that is correctable by an ECC may be referred to as a correctable error. An error that cannot be corrected by an ECC may be referred to as an uncorrectable error. One possible symptom of a core that is operating at too low a voltage is an increase in the number of correctable and uncorrectable errors.

During the initialization phase of the system, the processor may be configured to report all correctable errors. For example, the processor may be configured to issue an interrupt upon correction of an error. This interrupt may cause the processor to enter an error monitor. The error monitor is described in further detail below. In addition, the processor may be configured during initialization to periodically provide an interrupt, such as a system management interrupt, that causes the processor to enter a voltage speculation governor. The voltage speculation governor is described in further detail below.

During operation, a core may correct an error based on an ECC. In addition to correcting the error, the core may issue an interrupt indicating that an error was corrected. This interrupt may cause the system firmware to enter the error monitor 133. The error monitor may be responsible for logging the corrected error and which core corrected the error. Thus, the error monitor maintains a history of all errors that were corrected by each core. Once the error monitor has logged the corrected error, control may be based to the voltage speculation governor 134.

The voltage speculation governor may be entered through two paths. The first path, described above, is through the error monitor, when it is notified of an error that was corrected by the ECC. The second path is when a system management interrupt is received. As explained above, during initialization, the processor is configured to periodically provide a system management interrupt. When the interrupt is received, the system firmware may enter the voltage speculation governor.

Upon entering the voltage speculation governor, the error history of each core from the error monitor is analyzed. From this analysis, a correctable error rate may be determined. For example, the number of correctable errors received within a given time period may be determined. If the correctable error rate is above an increase threshold, the voltage speculation governor may determine that the core is operating at too low a voltage. The voltage speculation governor may then set a direction of voltage change to increase. If the rate of correctable errors is below a decrease threshold, this may indicate the core is operating at too high a voltage. The voltage speculation governor may set a direction of voltage change to decrease.

The voltage speculation governor may then cause the voltage that is being supplied to the core through the regulator to be changed by a preset amount. For example, the preset amount may be set to 5 mV. The direction of change, increase or decrease, may be the direction that was determined above.

In some example implementations, the increase and decrease thresholds may be a tunable parameter that is set by an administrator of the system. In other example implementations, the thresholds may also be a hard coded parameter. In yet other example implementations, the thresholds may be set using information that was determined during the stress tests that were described with respect to FIG. 2. For example, the increase threshold may be set to reflect the error rate that a core could tolerate before it started to experience uncorrectable errors, as reflected by failing the stress test.

In addition to monitoring correctable errors, the error monitor may also receive an indication of uncorrectable errors. In such cases, this information is passed to the voltage speculation governor. The voltage speculation governor may then immediately increase the voltage being supplied to the core to a safe voltage. For example, the voltage may immediately be increased to the nominal voltage specified by the manufacturer.

Figure 4:
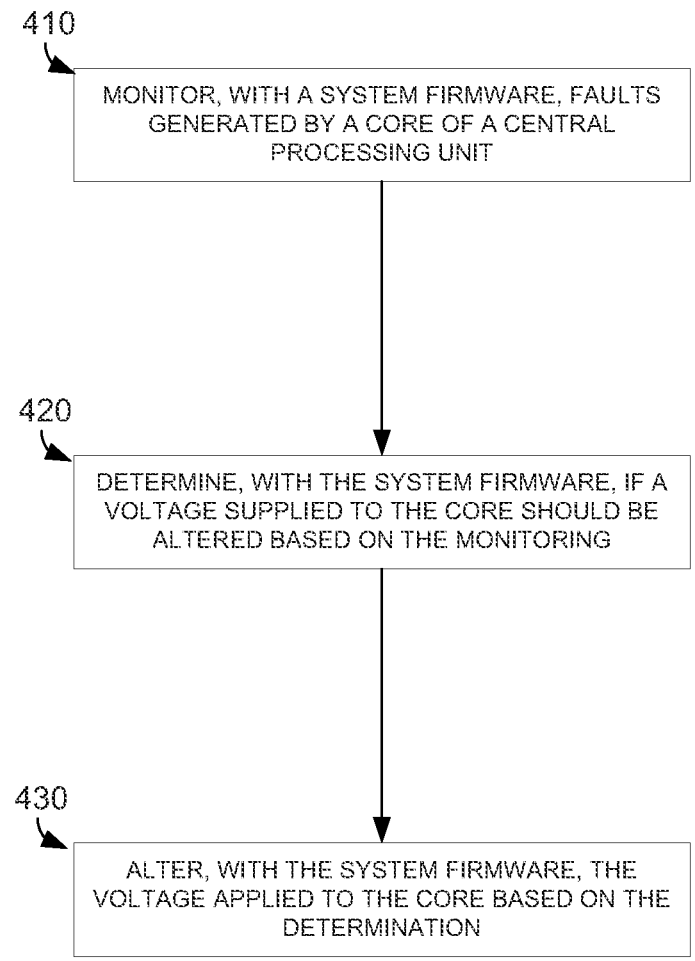
FIG. 4 is an example of a high level flow diagram for setting a core voltage according to the techniques described herein.

FIG. 4 is an example of a high level flow diagram for setting a core voltage according to the techniques described herein. In block 410, the system firmware may monitor faults generated by a core of a central processing unit. These faults may occur during the running of a stress test or during operation under the control of an operating system. In block 420, the system firmware may determine if a voltage supplied to the core should be altered based on the monitoring. As described above, if errors are occurring, the voltage may need to be increased, while if no errors occur, the voltage may be decreased. In block 430, the system firmware may alter the voltage supplied to the core based on the determination in block 420. The voltage may be increased, decreased, or remain the same.

Figure 5:
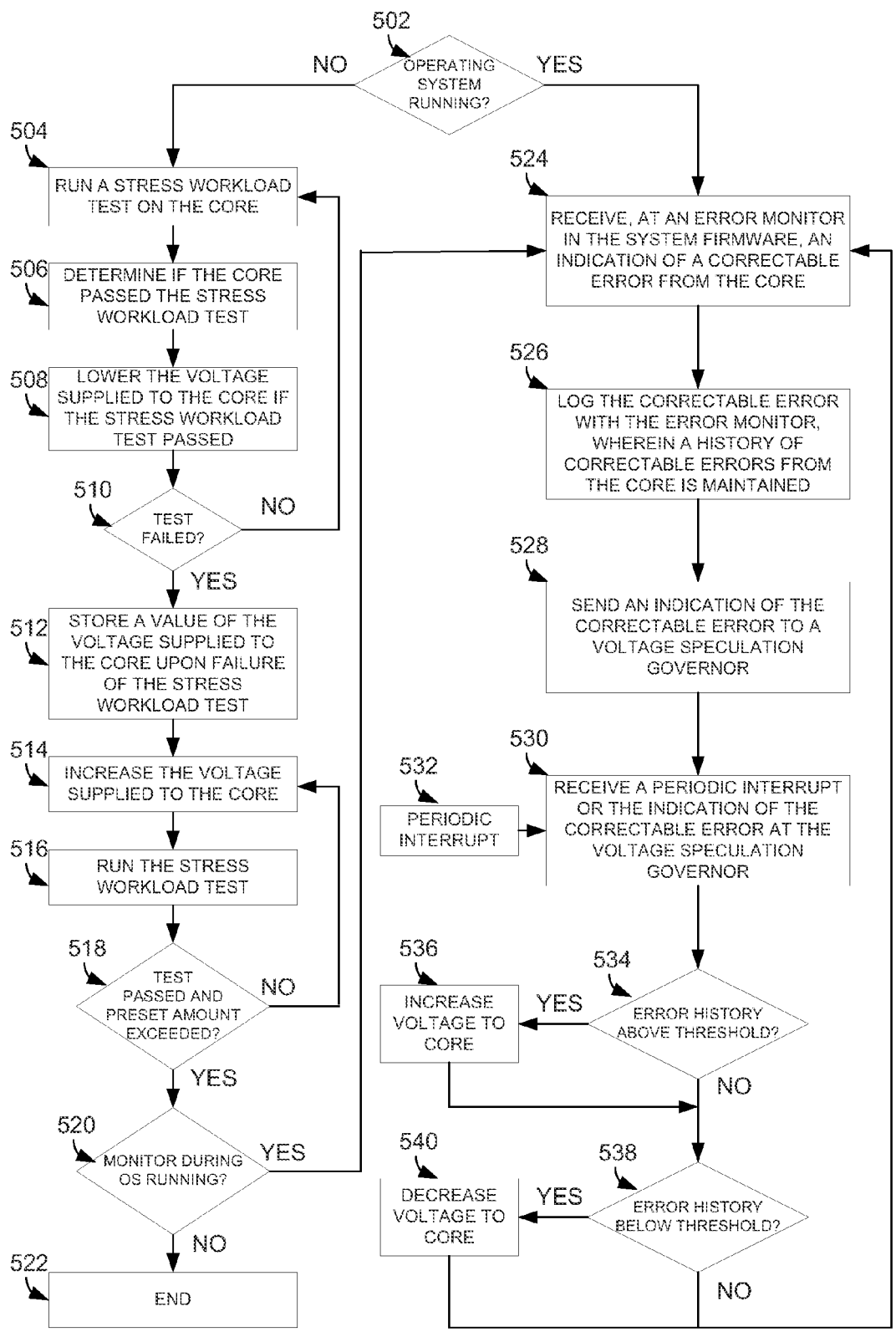
FIG. 5 is another example of a high level flow diagram for setting a core voltage according to the techniques described herein.

FIG. 5 is another example of a high level flow diagram for setting a core voltage according to the techniques described herein. In block 502, it may be determined if an operating system is running. If no operating system is running, thus the system is being initialized, the process moves to block 504. In block 504, a stress workload test may be run on the core. In block 506 it may be determined if the core passed the stress workload test. In block 508 the voltage supplied to the core may be lowered if the stress workload test passed. In block 510, it may be determined if the stress workload test failed. If the test did not fail, the process returns to block 504 and repeats. This cycle continues until the stress workload test fails, at which point the process moves to block 512.

In block 512, the value of the voltage supplied to the core upon failure of the stress workload test is stored. In other words, the voltage being supplied to the core at the time of failure is recorded. This voltage may be referred to as the failure voltage. In block 514, the voltage supplied to the core may be increased. In block 516, the stress workload test may be run again. In block 518, it may be determined if the stress workload test passes and the voltage being supplied to the core exceeds a preset amount. As explained above, this preset amount provides a margin for error in setting the voltage supplied to the core.

If the voltage does not yet exceed the preset amount, the process returns to block 514. Otherwise the process moves to block 520. In block 520, it is determined if the monitoring process should continue once the operating system is running. If not, the process moves to block 522 and ends. Otherwise the process moves to block 524. In block 524, an indication of a correctable error may be received from the core at an error monitor in the system firmware. In block 526 the correctable error may be logged with the error monitor. The logging may allow a history of correctable errors within the core to be maintained.

In block 528, an indication of the correctable error may be sent to a voltage speculation governor. Block 530 may be entered either from block 528 or upon receipt of a periodic interrupt from block 532. In block 530, the indication from the error monitor or the periodic interrupt may be received by the voltage speculation governor. In block 534 it may be determined if the error history for the core indicates the error rate is above a threshold. If so, the process moves to block 536. In block 536, the voltage supplied to the core may be increased.

Otherwise, the process moves to block 538. In block 538, it may be determined if the error history indicates the error rate of the core is below a threshold. If so, the process moves to block 540. In block 540, the voltage supplied to the core may be decreased. In either case, the process then returns to block 524.

Figure 6:
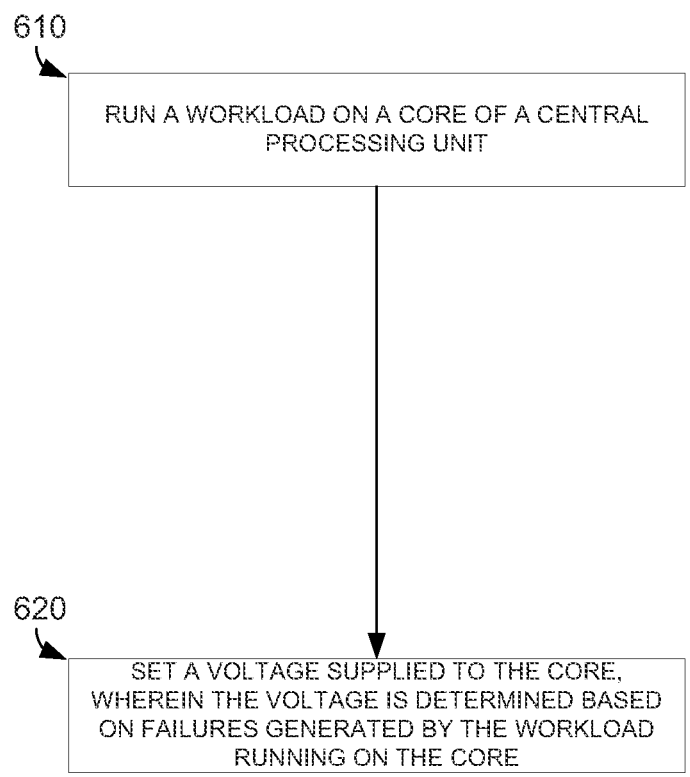
FIG. 6 is an example of a flow diagram for running a workload to determine a core operating voltage according to techniques described herein.

FIG. 6 is an example of a flow diagram for running a workload to determine a core operating voltage according to techniques described herein. In block 610, a workload may be run on a core of a central processing unit. As explained above, the workload may be a stress test workload or a workload from applications operating under the control of an operating system. In block 620, the voltage supplied to the core may be set based on failures generated by the workload running on the core.

Figure 7:
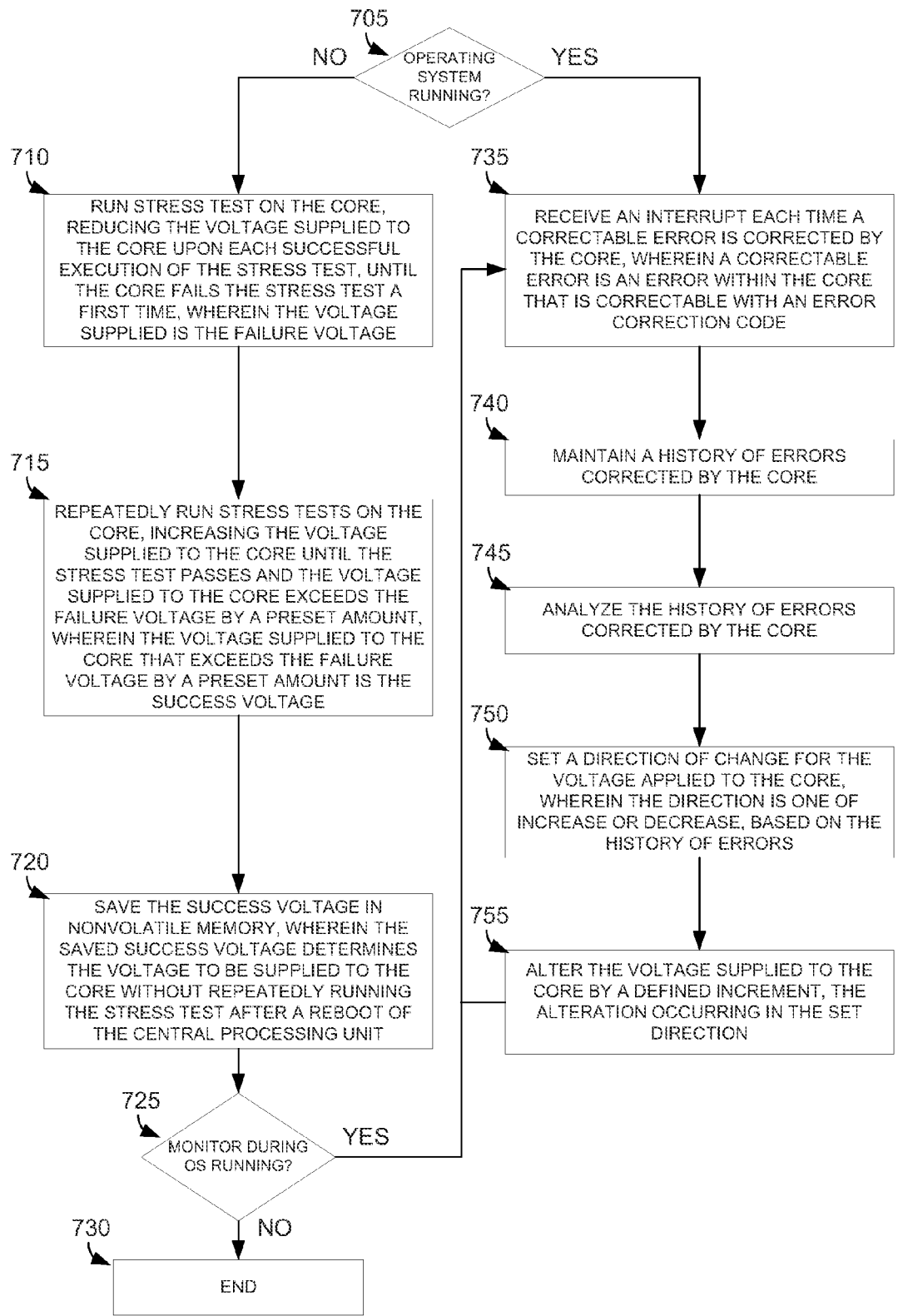
FIG. 7 is another example of a flow diagram for running a workload to determine a core operating voltage according to techniques described herein.

FIG. 7 is another example of a flow diagram for running a workload to determine a core operating voltage according to techniques described herein. In block 705 it may be determined if the operating system is running. If not, the process moves to block 710. In block 710, a stress test may be run repeatedly on the core. The voltage supplied to the core may be reduced upon each successful completion of the stress test. These steps may be repeated until the core fails the stress test for a first time. The voltage being supplied to the core may be the failure voltage.

In block 715, stress tests may be run repeatedly on the core. The voltage supplied to the core may be increased on each running of the stress test. This process may continue until the test passes and the voltage supplied to the core exceeds the failure voltage by a preset amount. The voltage may be the success voltage. In block 720, the success voltage may be saved in nonvolatile memory. The saved success voltage may be used to determine the voltage to be supplied to the core without having to repeatedly run the stress tests described above.

In block 725 it may be determined if the monitoring should continue once the operating system has taken over operation of the system. If not, the process moves to block 730 and ends. Otherwise the process moves to block 735. In block 735, an interrupt is received each time a correctable error is corrected by the core. A correctable error may be an error that is correctable by the core with an error correction code.

In block 740, a history of errors corrected by the core may be maintained. This history may be used to determine if the voltage supplied to the core should be changed. In block 745, the history of errors corrected by the core may be analyzed. In block 750, a direction of change for the voltage supplied to the core may be set. The direction may be set based on the history of errors. For example, if the history indicates the error rate is below a threshold, the direction may be set to decrease the voltage. Otherwise, if the error history indicates the rate of errors is above a threshold, the direction may be set to indicate the voltage should be increased.

In block 755, the voltage supplied to the core may be altered by a defined increment. The alteration may occur in the direction determined in block 750. Thus, if the determined direction was to increase the voltage, the voltage supplied to the core may be increased by the defined increment. Likewise, if the voltage is to be decreased, the voltage supplied to the core may be decreased by the defined amount.

I claim:

1. A method comprising:
monitoring, with a system firmware, faults generated by a given core of a plurality of cores of a central processing unit, wherein each core has an associated voltage regulator to provide a voltage, and the monitoring includes monitoring errors corrected by the given core;
determining, with the system firmware, if the voltage provided by the voltage regulator associated with the given core should be altered based on the monitoring and the errors corrected by the given core; and
altering, with the system firmware, the voltage provided to the given core by the associated voltage regulator based on the determination.

2. The method of claim 1, wherein the central processing unit does not include circuitry for altering, based on generated faults, the voltage supplied to the given core.

3. The method of claim 1, wherein monitoring faults further comprises:
running a stress workload test on the given core;
determining if the given core passed the stress workload test;
lowering the voltage provided to the given core if the stress workload test passed;
repeating the steps of running the stress workload test, determining if the given core passed the stress workload test, and lowering the voltage provided to the given core, until the given core fails the stress workload test; and
storing a value of the voltage provided to the given core upon failure of the stress workload test.

4. The method of claim 1, wherein monitoring faults further comprises:

receiving, at an error monitor in the system firmware, an indication of the occurrence of a given error of the errors corrected by the given core;

logging the given error with the error monitor such that a history of errors associated with the given core is maintained; and sending an indication of the given error to a voltage speculation governor.

5. The method of claim 3, wherein determining if the voltage provided to the given core should be altered further comprises:

increasing the voltage provided to the given core;

running the stress workload test;

repeating the steps of increasing the voltage provided to the given core and running the stress workload until both the stress workload test passes and the voltage provided to the given core exceeds the stored value of voltage supplied to the given core by a preset amount.

6. The method of claim 4, wherein determining if the voltage provided to the given core should be altered further comprises:

receiving a periodic interrupt or the indication of the given error at the voltage speculation governor; and determining, with the voltage speculation governor, if the voltage provided to the given core should be increased or decreased based on the history of errors corrected by the given core.

7. The method of claim 6, wherein determining, with the voltage speculation governor, if the voltage provided to the given core should be increased or decreased further comprises:

increasing the voltage if the history of the errors corrected by the given core is above a first threshold; and decreasing the voltage if the history of the errors corrected by the given core is below a second threshold other than the first threshold.

8. A non-transitory processor readable medium containing thereon instructions which when executed by a processor cause the processor to:

run a workload on a given core of a plurality of cores of a central processing unit, wherein each core has an associated voltage regulator to provide a voltage;

cause the voltage regulator associated with the given core to regulate a voltage provided to the given core based at least in part on an indication of faults generated by the given core in response to the workload running on the given core;

receive an interrupt each time a correctable error is corrected by the given core, wherein a correctable error is an error within the given core that is correctable with an error correction code; and maintain a history of errors corrected by the given core, wherein the instructions when executed by the processor causes the processor to regulate the voltage based in least in part on a time rate of errors corrected by the given core.

9. The non-transitory processor readable medium of claim 1, wherein the instructions to run a workload on a given core comprise instructions to:

repeatedly run stress tests on the given core, reducing the voltage provided to the given core upon each successful execution of the stress test, until the given core fails the stress test a first time, wherein the voltage provided is a failure voltage; and repeatedly run stress tests on the given core, increasing the voltage provided to the given core until the stress test passes and the voltage supplied to the given core exceeds the failure voltage by a preset amount, wherein the voltage provided to the given core that exceeds the failure voltage by a preset amount is a success voltage.

10. The non-transitory processor readable medium of claim further comprising instructions to:

save the success voltage in a nonvolatile memory, wherein the saved success voltage determines the voltage to be provided to the given core without repeatedly running the stress test after a reboot of the central processing unit.

11. The non-transitory processor readable medium of claim 9, further comprising instructions to:

analyze the history of errors corrected by the given core;

set a direction of change for the voltage applied to the given core, wherein the direction is one of increase or decrease, based on the history of errors;

alter the voltage supplied to the given core by a defined increment, the alteration occurring in the set direction.

12. The non-transitory processor readable medium of claim 11, wherein the instructions of claim 11 are executed upon receipt of a system management interrupt or the interrupt received each time a correctable error is corrected by the given core.

13. A system comprising:

a processor comprising a plurality of cores, wherein each core comprises an associated execution unit that indicates errors corrected by the execution unit;

a non-transitory processor readable medium containing thereon a set of system firmware instructions which when executed by the processor cause the processor to:

determine a voltage to be supplied to a given core of the plurality of cores based at least in part on the errors corrected by the associated execution unit; and set a voltage regulator supplying voltage to the given core to supply the determined voltage to the given core.

14. The system of claim 13, wherein the processor causes an interrupt serviced by system firmware in response to the instruction unit associated with the given core correcting an error, wherein the system firmware determines the voltage to be supplied to the given core independent of the processor hardware.

15. The method of claim 1, wherein monitoring, with the system firmware, faults generated by the given core of the central processing unit comprises monitoring, with the system firmware, faults generated by an execution unit of the given core.

16. The non-transitory processor readable medium of claim 8, wherein the instructions when executed by the processor cause the processor to set the voltage provided to the given core based on faults indicated by an execution unit of the given core.

* * * * *